United States Patent [19]

Peltz

[11] Patent Number: 5,896,214
[45] Date of Patent: Apr. 20, 1999

[54] MOUNTING BRACKET FOR MOUNTING ELECTRONIC COMPONENTS IN A PORTABLE ELECTRONIC DEVICE AND METHOD OF MAKING SAME

[75] Inventor: Harold R. Peltz, Iowa City, Iowa

[73] Assignee: Intermec IP Corp., Beverly Hills, Calif.

[21] Appl. No.: 08/674,279

[22] Filed: Jul. 1, 1996

[51] Int. Cl.⁶ .................................................. H04B 10/14
[52] U.S. Cl. .......................... 359/159; 359/152; 455/90
[58] Field of Search .............................. 359/142, 152, 359/159, 143, 163; 455/90, 128

[56] References Cited

U.S. PATENT DOCUMENTS

| | | | |
|---|---|---|---|
| 4,856,090 | 8/1989 | Kitani et al. | 359/142 |
| 5,027,433 | 6/1991 | Menadier et al. | 359/152 |
| 5,122,893 | 6/1992 | Tolbert | 359/152 |
| 5,130,520 | 7/1992 | Shepard et al. | 235/472 |
| 5,291,325 | 3/1994 | Elliot | 359/142 |
| 5,347,605 | 9/1994 | Isaksson | 385/92 |
| 5,416,627 | 5/1995 | Wilmoth | 359/152 |
| 5,528,408 | 6/1996 | McGinley et al. | 359/152 |
| 5,604,361 | 2/1997 | Isaksson | 257/99 |

*Primary Examiner*—Leslie Pascal
*Attorney, Agent, or Firm*—Suiter & Associates PC

[57] ABSTRACT

A portable electronic device comprising a mounting bracket having a cylindrical aperture for mounting a cylindrical electronic components such as a light emitting diode or the like. A mounting bracket according to an embodiment of the present invention may be used to mount an infrared (IR) assembly in a hand-held data collection terminal. This IR assembly may comprise one or more infrared light emitting diodes for transmitting infrared data transmission signals and may also comprise an infrared receiver for sensing and receiving infrared data transmission signals from an infrared data transmission source. Also described is a process for making a small part having a cylindrical aperture, such as a mounting bracket for an IR assembly, is also disclosed. According to this process, cylindrical apertures may be molded into the part without the use of slide pins.

8 Claims, 4 Drawing Sheets

MOUNTING BRACKET FOR MOUNTING ELECTRONIC COMPONENTS IN A PORTABLE ELECTRONIC DEVICE AND METHOD OF MAKING SAME

TECHNICAL FIELD

The present invention relates generally to portable electronic devices and specifically to apparatus for mounting electronic components within a portable electronic device.

BACKGROUND OF THE INVENTION

Assemblies for transmitting and receiving data are used in a variety of portable hand held electronic devices. Typical of these assemblies are IR assemblies which may consist of one or more infrared light emitting diodes (LEDs) for transmitting data and an infrared receiver for receiving data. To function efficiently, the IR assembly's LEDs and receiver must be properly aligned. However, because these components are usually soldered directly to a circuit board in the electronic device, achieving a proper alignment may be difficult and costly. Further, the LEDs and receiver may be easily knocked out of alignment if the electronic device is dropped or otherwise mishandled. Likewise, many other electronic devices which transmit electromagnetic or sound waves may require a mounting bracket to provide correct alignment of their components. For these reasons, it is desirable to provide a mounting bracket which may be used in a portable electronic device to correctly align electronic components of a data transmission assembly such as an IR assembly. It is also desirable to provide a mounting bracket having apertures or holes for mounting cylindrical components such as LEDs or the like.

Presently, in order to manufacture a small plastic part having holes or apertures, a mold employing slide pins must be used. Slide pins must be slightly tapered so that they may be properly inserted and removed from a mold. Consequently, the inner surface of an aperture formed using slide pins will have the same taper. This taper may cause a cylindrical electronic component such as an LED to fit poorly and may lead to incorrect vertical or horizontal alignment of that component. Additionally, slide pins are difficult to use if they must be inserted into the mold at other than a right angle to the rest of the mold assembly. Thus, it is desirable to have an efficient process for manufacturing a small plastic part having cylindrical apertures without the use of slide pins.

OBJECTS OF THE INVENTION

Therefore, it is an object of the present invention to provide a mounting bracket having apertures for mounting and/or aligning electronic components such as LEDs or the like in a portable electronic device.

It is another object of the present invention to provide a an efficient means of molding a small plastic part having an aperture, such a mounting bracket for mounting and/or aligning cylindrical electronic components such as LEDs or the like in a portable electronic device, without the use of slide pins.

It is another object of the present invention to provide an IR assembly having such a mounting bracket for mounting the assembly's LEDs and receiver.

It is yet another object of the present invention to provide a mounting bracket for an IR assembly to properly align the LEDs and receiver of an IR assembly.

It is still another object of the present invention to provide a mounting bracket which will maintain proper alignment of the LEDs and receiver of an IR assembly if the electronic device in which they are mounted is dropped or mishandled.

It is a further object of the present invention to provide mounting brackets which may be adapted to a wide variety of IR assembly configurations wherein the LEDs are oriented in various directions from the infrared receiver.

SUMMARY OF THE INVENTION

The present invention provides a portable electronic device comprising a mounting bracket having a aperture for mounting an electronic device such as a light emitting diode or the like. The mounting bracket may be employed to mount the components of any assembly for transmitting and receiving data to a circuit board. Such assemblies may include devices for transmitting and receiving electromagnetic or sound wave data transmission signals. In an exemplary embodiment, a mounting bracket may be used to mount an infrared (IR) assembly to a circuit board of a portable electronic device such as a hand-held data collection terminal. The IR assembly may comprise one or more infrared light emitting diodes for transmitting infrared data transmission signals and may also comprise an infrared receiver for sensing and receiving infrared data transmission signals from an infrared data transmission source. The mounting bracket may have a centrally disposed horizontal surface or shelf to support the infrared receiver. Vertical supports may be molded into the bracket on either side of this horizontal surface. These supports may have a cylindrical aperture into which a light emitting diode may be inserted. In this way, the LEDs of the IR assembly may be positioned on either side of the infrared receiver.

A process for making a small part having a aperture, such as a mounting bracket for an IR assembly, is also disclosed. According to this process, a mold comprising lower female and upper male mold halves is first assembled. The lower mold half preferably has a cavity conforming to the outer shape of the upper surface of the part. Likewise, the upper mold half may be formed so that it conforms to the outer shape of the lower surface of the part. In this way, the use of slide pins to create the cylindrical apertures is eliminated. A nylon plastic material or the like may then be injected into the mold and allowed to harden or cure. After hardening, the mold may be disassembled and the finished part removed.

BRIEF DESCRIPTION OF THE DRAWING

The numerous objects and advantages of the present invention may be better understood by those skilled in the art by reference to the accompanying figures in which.

DETAILED DESCRIPTION OF AN EXEMPLARY EMBODIMENT

Figure 1:
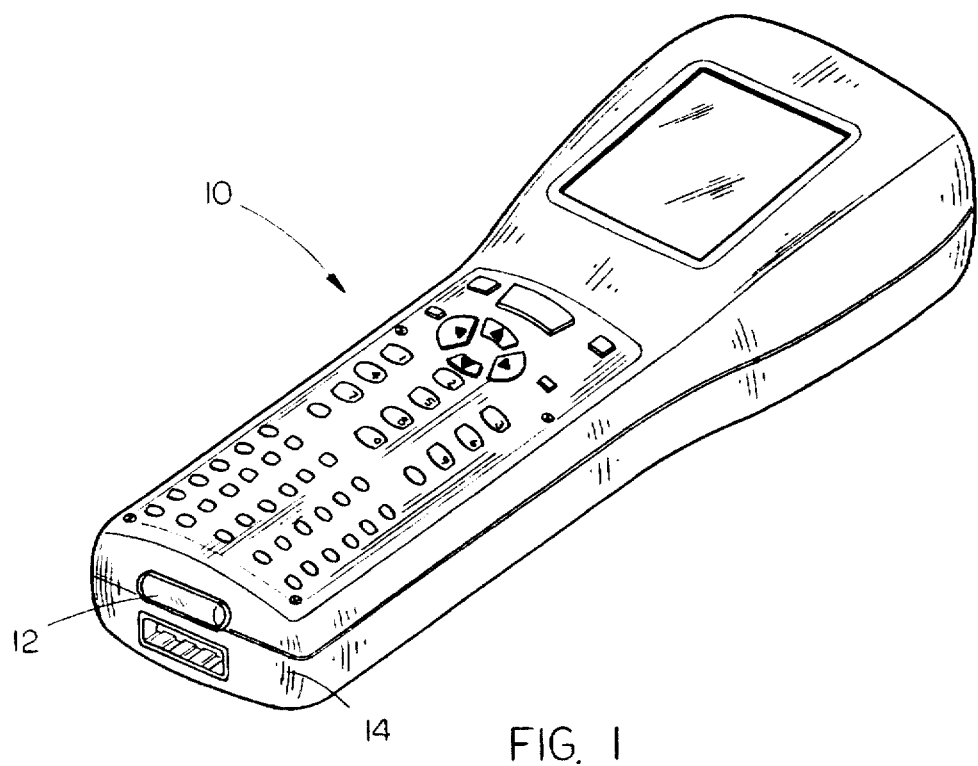
FIG. 1 is a pictorial view of a portable hand-held data collection terminal comprising an IR assembly of the type utilizing a mounting bracket according to an exemplary embodiment the present invention.
Figure 2:
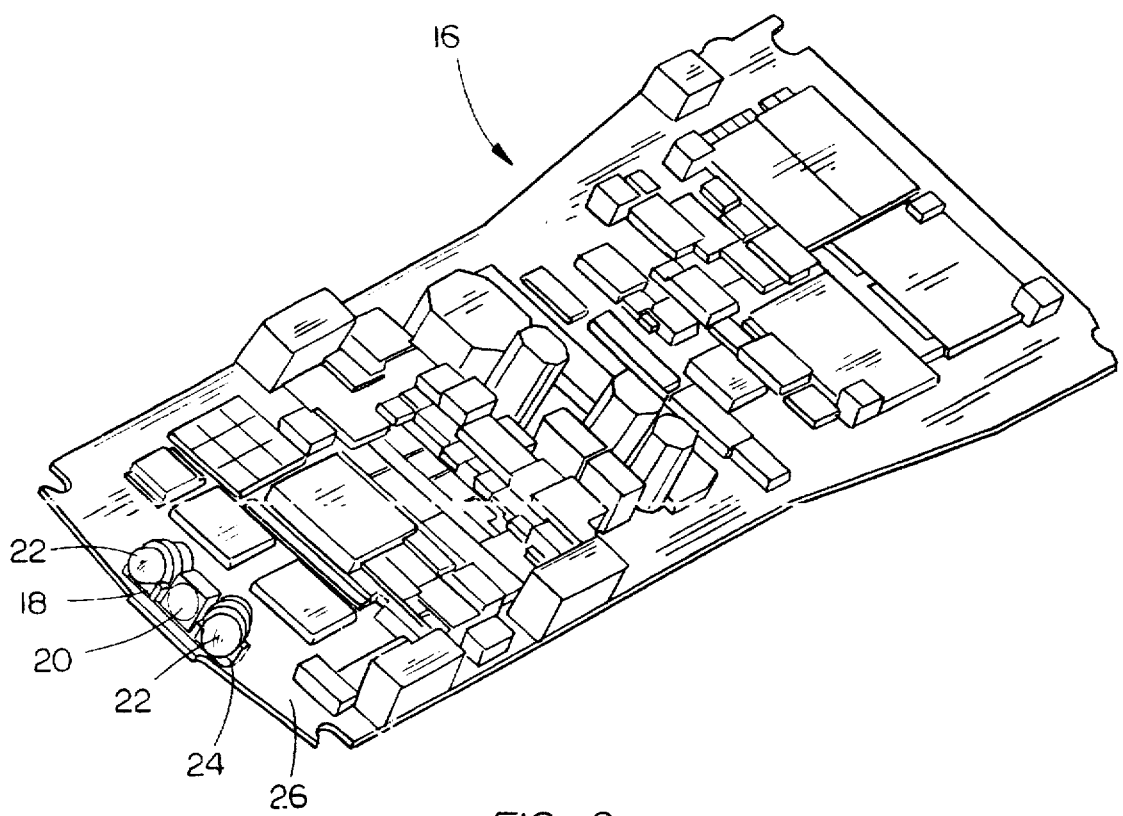
FIG. 2 is a pictorial view of the main logic board of the portable hand-held data collection terminal shown in FIG. 1.

The present invention provides a portable electronic device comprising a mounting bracket having an aperture for mounting a electronic device such as a light emitting diode or the like. The mounting bracket may be employed to mount the components of any assembly for transmitting and receiving data to a circuit board. Such assemblies may include devices for transmitting and receiving electromagnetic or sound wave data transmission signals. In an exemplary embodiment, the mounting bracket may be utilized to mount the components of an infrared (IR) assembly in a portable hand-held data terminal. FIG. 1 depicts a portable hand held data collection terminal 10, typical of the portable hand held electronic devices which may utilize an IR assembly having a mounting bracket according to an exemplary embodiment of the present invention. An IR port 12 comprising an IR assembly for transmitting and receiving data may be located in the lower end 14 of data terminal 10. FIG. 2 depicts the main logic board 16 of the data terminal shown in FIG. 1. An IR assembly 18 comprising a receiver 20 and two infrared LEDs 22 mounted in a mounting bracket 24 may be fixed to the lower end 26 of the main logic board 16. This mounting bracket 24 maintains proper alignment of the LEDs 22 and receiver 20 so that the IR assembly may function properly. The mounting bracket 24 may also protect the LEDs 22 and receiver 20 from damage by isolating them from shock caused by accidental mishandling of the data terminal.

Figure 3:
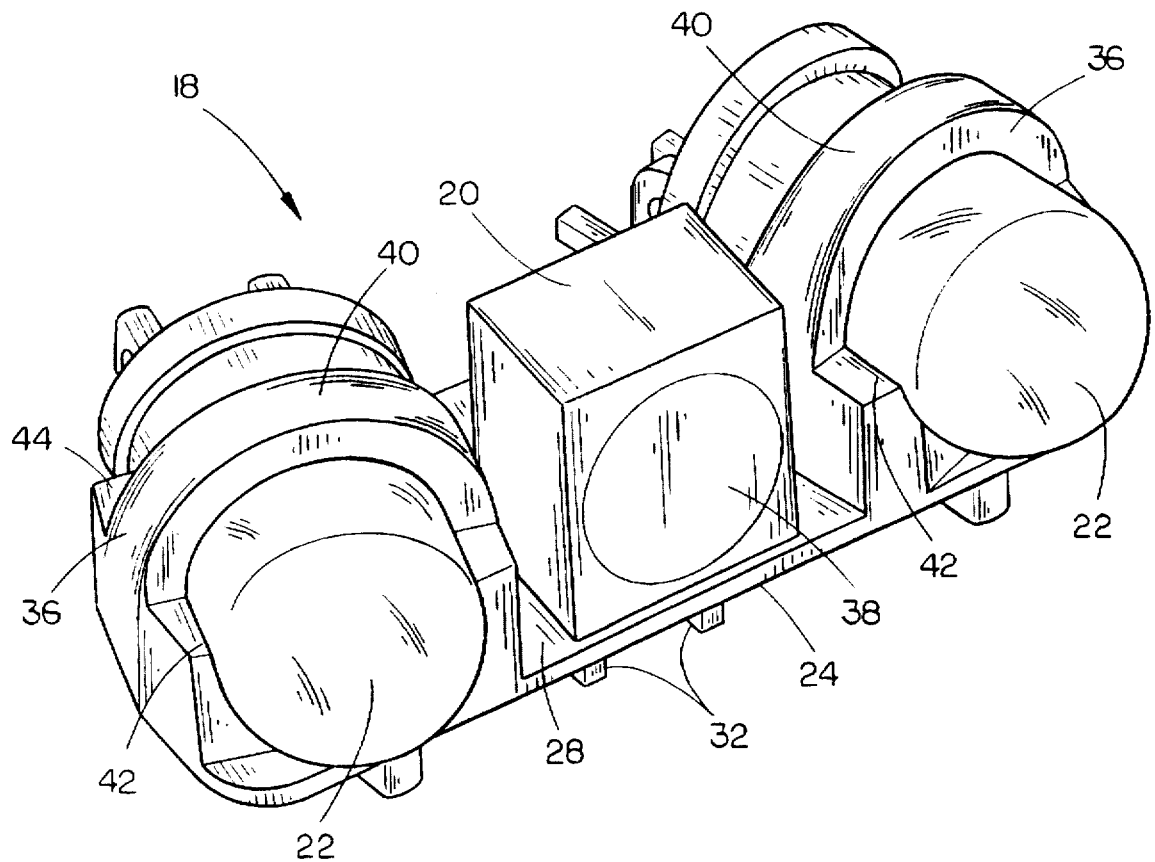
FIG. 3 is a pictorial view of an IR assemble according to an exemplary embodiment of the present invention comprising a mounting bracket having 2 infrared LEDs and an infrared receiver mounted therein.
Figure 4:
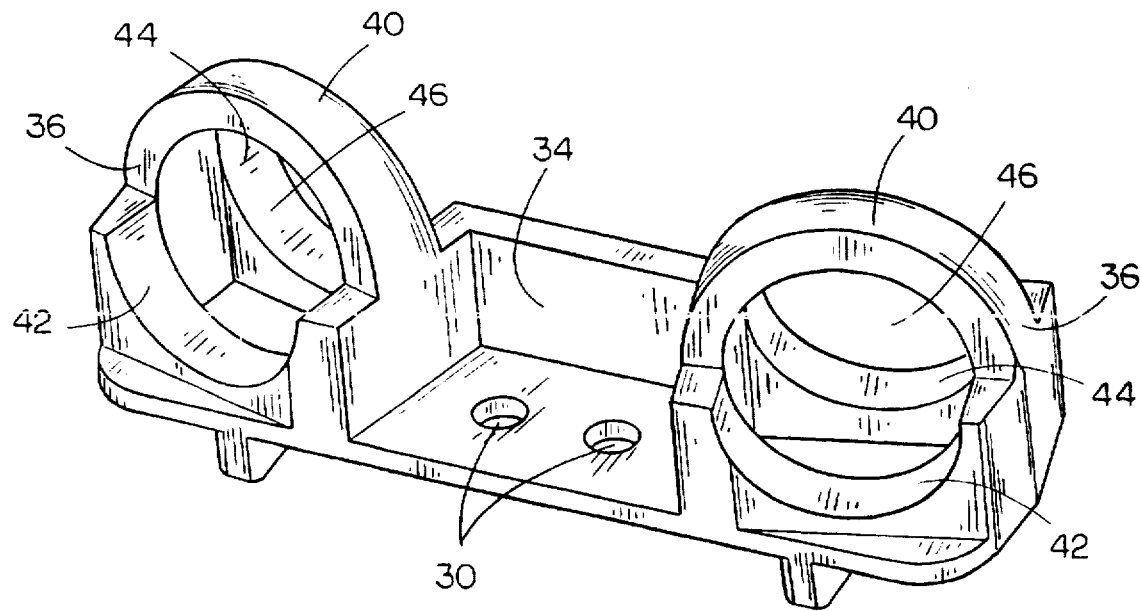
FIG. 4 is a pictorial view of the mounting bracket shown in FIG. 3.

FIGS. 3 and 4 illustrate an IR assembly 18 utilizing the mounting bracket 24 shown in FIG. 2. The mounting bracket 24 may have a centrally disposed horizontal surface or shelf 28 for mounting the infrared receiver 20. This shelf 28 may have holes 30 through which the receiver's leads 32 may pass. A rear wall or flange 34 molded into the bracket behind the shelf 28, may provide additional support to the receiver 20 and rigidity to the bracket. A vertical support 36 may be molded into the bracket 24 on each side of the horizontal shelf 28 and may be oriented to face away from the face 38 of the infrared receiver 20 at an angle. These supports 36 may each comprise an upper arch 40 centered between front and back lower concave surfaces (42 & 44). The arch 40 and front and back concave surfaces (42 & 44) may form a cylindrical aperture or channel 46 into which an LED 22 may be inserted. The LEDs 22 may be positioned on either side of the infrared receiver 20 so that they face away from the receiver 20 at an angle to the to a plane normal to the face 38 of the receiver.

FIG. 3 illustrates an exemplary embodiment of the present invention wherein the LEDs 22 are mounted facing away from the receiver 20 at a horizontal angle of 5°. Those skilled in the art will recognize that other horizontal angles are possible depending on the application and the types of receivers and LEDs utilized. Preferably, these angles may range from 0 to 90 degrees. Likewise, the LEDs may be mounted so that they may be oriented to face any vertical angle from +90 degrees above to −90 degrees below the horizontal. Thus, the present invention contemplates orientation of the LEDs so that they may face any angle desired within a half sphere surrounding the receiver.

Preferably, the aperture 46 is not tapered so that it has a constant diameter throughout its width. This constant diameter allows a tight fit between the bracket 24 and the LEDs 22 and proper alignment of the LEDs with the receiver 20.

A process for making a small part having an aperture, such as a mounting bracket for an IR assembly, is also disclosed. Presently, in order to manufacture such a part, a mold employing slide pins must be used. Slide pins must be slightly tapered so that they may be properly inserted and removed from a mold. Consequently, the inner surface of an aperture formed using slide pins will have the same taper. This taper may cause a cylindrical electronic component such as an LED to fit poorly and may lead to incorrect vertical or horizontal alignment of that component. Additionally, slide pins are difficult to use if they must be inserted into the mold at other than a right angle to the rest of the mold assembly.

Figure 5:
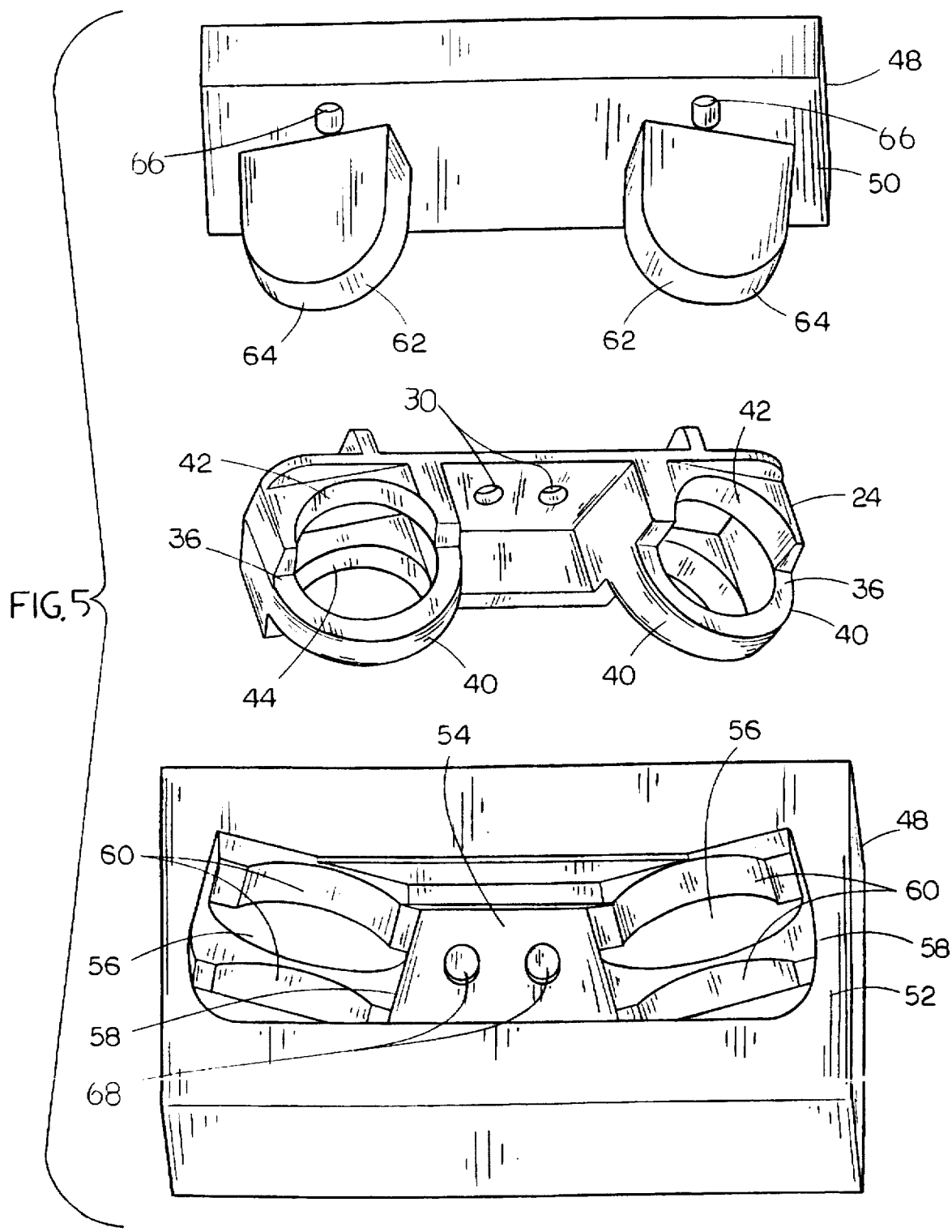
FIG. 5 is an exploded view depicting a mold which may be used to form the mounting bracket shown in FIG. 3.
Figure 6:
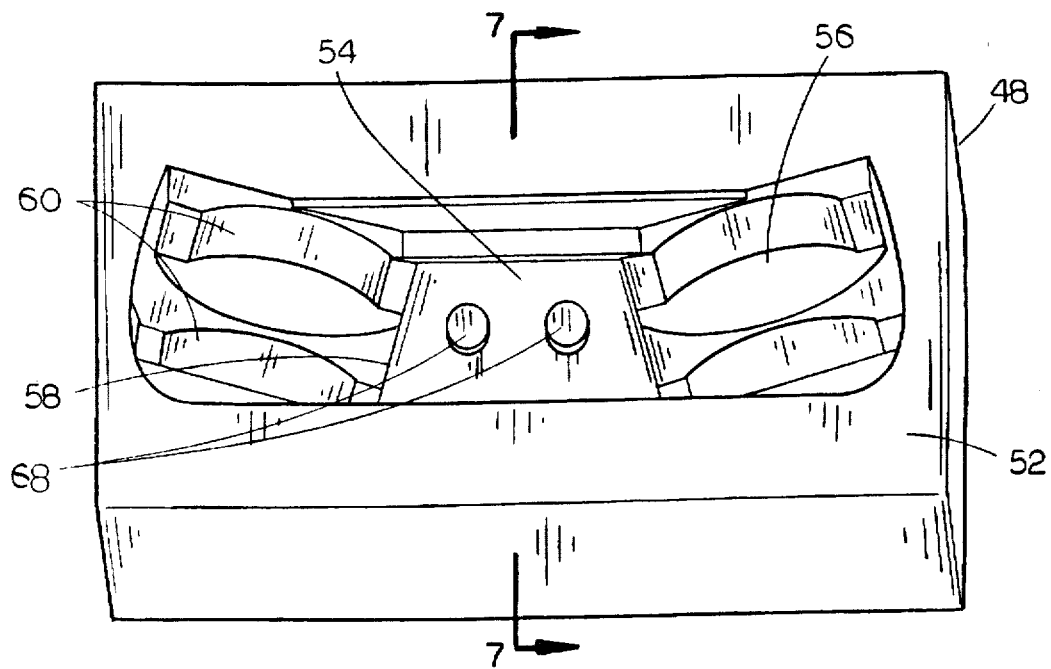
FIG. 6 is a pictorial view of the female lower mold half depicted in FIG. 5.
Figure 7:
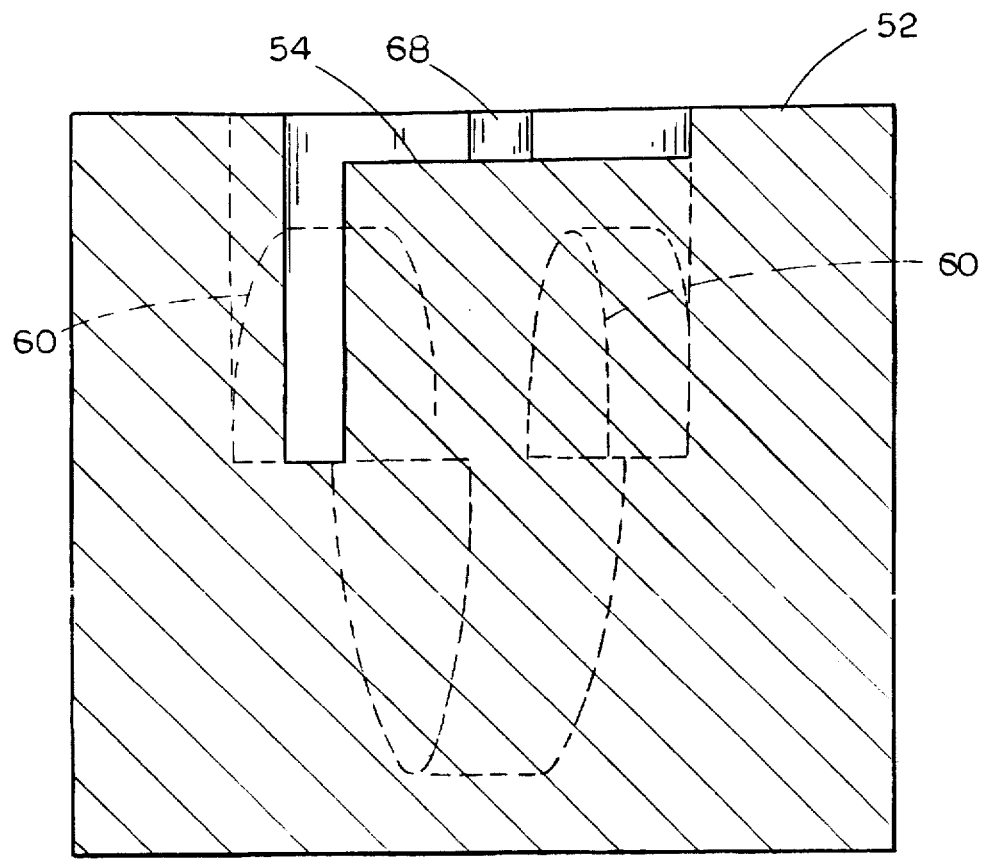
FIG. 7 is a cross-sectional elevational view of the mold half shown in FIG. 6.

FIGS. 5 through 7 depict a mold 48 according to an exemplary embodiment of the present invention, comprising an upper or male mold half 50 and a lower or female mold half 52 which may be used to form a mounting bracket 24 or the like. As shown in the lower mold half 52 preferably comprises a cavity 54 conforming to the outer shape of the upper surface of the mounting bracket 24. This cavity 54 may have two wells 56 corresponding to the supports 36 of the bracket 24. These wells 56 may have a deep rounded trough 58 centered between two rounded tabs 60 to form the upper face of the arch 40 and concave surfaces (42 & 44) of a mounting bracket LED support 36. Posts 68 may be included in the cavity 54 to form holes or apertures 30 for mounting a receiver or the like (not shown). Likewise, the upper mold half 50 may form the outer shape of the lower surface of the mounting bracket 24. The upper mold half 50 may comprise two blanks or tabs 62 which may have a rounded upper face 64. When the upper mold half 50 and the lower mold half 52 are assembled together, these blanks 62 are preferably inserted into the corresponding wells 56 in the lower mold half. In this way, the central upper arch 40 and front and back lower concave surfaces (42 & 44) of the LED supports 36 may be molded.

The present invention eliminates the use of slide pins or the like to mold the apertures 46 in the LED supports 36. Because the slide pins must be slightly tapered so that they may be properly inserted and removed from a mold, the inner surface of an aperture formed using slide pins will have the same taper. This taper may cause the LED to fit poorly and may lead to incorrect vertical or horizontal alignment of the LED. Additionally, slide pins would be difficult to use to mold the mounting bracket shown because they must be inserted into the mold at other than a right angle to the rest of the mold assembly. Although the embodiments shown illustrate a mold for making a mounting bracket having cylindrical apertures, those skilled in the art will recognize that it is possible to mold parts with apertures having other shapes.

A plastic material such as a nylon or the like may then be injected into the mold 48 through ports 66 and allowed to harden or cure. After hardening, the mold 48 may be disassembled and the finished mounting bracket removed.

In view of the above detailed description of a preferred embodiment and modifications thereof, various other modifications will now become apparent to those skilled in the art. The claims below encompass the disclosed embodiments and all reasonable modifications and variations without departing from the spirit and scope of the invention.

What is claimed is:

1. A mounting bracket for mounting an emitter and a receiver of a data transmitting and receiving assembly in a portable electronic device, said mounting bracket comprising:

a generally flat surface formed on said mounting bracket for supporting said receiver; and a support formed on said mounting bracket adjacent to said surface, said support including an arch and front and back concave surfaces forming a cylindrical aperture having a constant diameter throughout its depth for securely holding said emitter so that said emitter is properly aligned with said receiver.

2. The mounting bracket according to claim 1, wherein said support is oriented with respect to said surface so that said emitter faces away from said receiver at an angle.

3. The mounting bracket according to claim 2, wherein said emitter is faced away from said receiver at an angle of from 0 to 90 degrees.

4. The mounting bracket according to claim 2, wherein said emitter is faced away from said receiver at an angle of from 0 to −90 degrees.

5. The mounting bracket according to claim 1, wherein said surface includes a hole for receiving a lead of said receiver.

6. The mounting bracket according to claim 1, further comprising a second support formed in said mounting bracket so that said first support and said second support are positioned one on either side of said surface, said second support including an arch and front and back concave surfaces forming a cylindrical aperture having a constant diameter throughout its depth for securely holding a second emitter so that said second emitter is properly aligned with said receiver.

7. The mounting bracket according to claim 6, further comprising a flange formed in said mounting bracket between said first and second supports and behind said surface for further supporting said receiver and providing rigidity to said mounting bracket.

8. The mounting bracket according to claim 1, wherein said receiver is an infrared receiver and said emitter is an infrared light emitting diode.

* * * * *